(12) United States Patent
Qiu et al.

(10) Patent No.: US 10,864,521 B2
(45) Date of Patent: Dec. 15, 2020

(54) DETECTION MECHANISM FOR POLYMERASE CHAIN REACTION AND POLYMERASE CHAIN REACTION DEVICE

(71) Applicants: Beijing Wantai Biological Pharmacy Enterprise Co., Ltd., Beijing (CN); Beijing University of Chemical Technology, Beijing (CN); Xiamen University, Xiamen (CN)

(72) Inventors: Xianbo Qiu, Beijing (CN); Xiangzhong Ye, Beijing (CN); Shengxiang Ge, Xiamen (CN); Shiyin Zhang, Xiamen (CN); Pengfei Gao, Beijing (CN); Shangzhi Ji, Beijing (CN); Yongliang Yang, Beijing (CN); Zixin Qiu, Beijing (CN); Ningshao Xia, Xiamen (CN)

(73) Assignees: Beijing Wantai Biological Pharmacy Enterprise Co., Ltd., Beijing (CN); Beijing University of Chemical Technology, Beijing (CN); Xiamen University, Xiamen (CN)

( * ) Notice: Subject to any disclaimer, the term of this patent is extended or adjusted under 35 U.S.C. 154(b) by 314 days.

(21) Appl. No.: 15/774,953

(22) PCT Filed: Oct. 25, 2016

(86) PCT No.: PCT/CN2016/103153
§ 371 (c)(1),
(2) Date: May 9, 2018

(87) PCT Pub. No.: WO2017/080358
PCT Pub. Date: May 18, 2017

(65) Prior Publication Data
US 2018/0326422 A1     Nov. 15, 2018

(30) Foreign Application Priority Data

Nov. 10, 2015    (CN) .......................... 2015 1 0762545

(51) Int. Cl.
*B01L 7/00*          (2006.01)
*G01N 21/64*       (2006.01)

(52) U.S. Cl.
CPC ................. *B01L 7/52* (2013.01); *B01L 7/525* (2013.01); *B01L 7/54* (2013.01); *G01N 21/645* (2013.01);
(Continued)

(58) Field of Classification Search
None
See application file for complete search history.

(56) References Cited

U.S. PATENT DOCUMENTS 6,197,572 B1 * 3/2001 Schneebeli ......... B01L 3/50851
435/286.2
2008/0248534 A1 * 10/2008 Lim ....................... G05D 23/32
435/91.2
(Continued)

FOREIGN PATENT DOCUMENTS

| CN | 101251486 A | 8/2008 |
|---|---|---|
| CN | 102308219 A | 1/2012 |

(Continued)

OTHER PUBLICATIONS

International Search Report for PCT/CN2016/103153 dated Jan. 23, 2017.

*Primary Examiner* — Holly Kipouros
(74) *Attorney, Agent, or Firm* — Honigman LLP

(57) ABSTRACT

The present invention relates to a detection mechanism for polymerase chain reaction and a polymerase chain reaction device, wherein the detection mechanism comprises at least one excitation module group, each of the excitation module
(Continued)

groups comprising two excitation modules for providing excitation light with two wavelengths; an excitation optical fiber, connected to the excitation modules, the excitation optical fiber transmitting the excitation light to at least one reaction tube, each of the reaction tubes receiving excitation light with two wavelengths; a receiving optical fiber, for collecting and transmitting a fluorescent signal from the reaction tube; at least one receiving module group, connected to the receiving optical fiber, each of the receiving module groups comprising two receiving modules, to respectively receive the fluorescent signal of two wavelengths from the same said reaction tube, and convert the fluorescent signal into an electrical signal for output; the detection mechanism is configured to detect the reaction tube in a time division manner, and multiplex the receiving module group to obtain an output result.

10 Claims, 2 Drawing Sheets

(52) U.S. Cl.
CPC ..... *G01N 21/6428* (2013.01); *G01N 21/6452* (2013.01); *B01L 2200/147* (2013.01); *B01L 2300/1805* (2013.01); *B01L 2400/0445* (2013.01); *G01N 2021/6419* (2013.01); *G01N 2021/6421* (2013.01); *G01N 2021/6471* (2013.01); *G01N 2021/6484* (2013.01); *G01N 2201/0627* (2013.01); *G01N 2201/08* (2013.01); *G01N 2201/0826* (2013.01); *G01N 2201/0833* (2013.01)

(56) References Cited

U.S. PATENT DOCUMENTS

| | | | | |
|---|---|---|---|---|
| 2013/0109021 | A1* | 5/2013 | Hwang | B01L 7/52 435/6.12 |
| 2014/0011266 | A1* | 1/2014 | Webster | B01L 7/52 435/286.1 |
| 2015/0377829 | A1* | 12/2015 | Matsumoto | G01N 27/44791 204/602 |

FOREIGN PATENT DOCUMENTS

| | | |
|---|---|---|
| CN | 102803465 A | 11/2012 |
| CN | 103688159 A | 3/2014 |
| CN | 205091265 U | 3/2016 |
| JP | 2009014379 A | 1/2009 |
| WO | 2007137273 A2 | 11/2007 |

* cited by examiner

DETECTION MECHANISM FOR POLYMERASE CHAIN REACTION AND POLYMERASE CHAIN REACTION DEVICE

CROSS-REFERENCE TO RELATED APPLICATIONS

This application is National Stage Application and claims priority under 35 U.S.C. § 371 to Patent Cooperation Treaty application PCT/CN2016/103153, filed Oct. 25, 2016, which claims the benefit of Chinese Patent Application No. 201510762545.0, filed Nov. 10, 2015, priory is claimed to both of these applications and the disclosures of these prior applications are considered part of the disclosure of this application and to the extent allowed the entire contents of the aforementioned applications are incorporated herein.

TECHNICAL FIELD

The present invention relates to the field of biomedical engineering technology, in particular to a detection mechanism for polymerase chain reaction and a polymerase chain reaction device.

BACKGROUND ART

Polymerase Chain Reaction (PCR) is a molecular biotechnology used to amplify specific DNA fragments. PCR generally requires performing repetitive thermal cycling steps of a reaction mixture with two or three temperatures.

As one of the most important technologies in molecular biology, PCR technology has played a significant role in the field of life science and medicine since it was born until now. PCR technology holds the characteristics of high sensitivity and good specificity. In particular, the fluorescent quantitative PCR method can quantify an original concentration of a detection sample and provide important clinical inspection information for disease diagnosis. PCR is a periodical gene amplification reaction. Each amplification period includes three stages consisting in DNA denaturation, annealing and extension. Moreover, each stage requires different temperature conditions, and the three stages constitute a complete period of heat cycle. The periodical reaction temperature conditions required for PCR are often provided by a specialized PCR instrument. The PCR instrument is provided by complicated software and hardware designs, and switches the three reaction temperatures required for PCR in real time. In a mutual switching process of switching among different reaction temperatures, limited by the rate of temperature rise and fall of the instrument, the transition process between different reaction stages often need to take a long time, which makes the PCR reaction time reach an average of 1.5 to 2.5 hours.

As a new PCR amplification technology, convection PCR which relies on one or two constant reaction temperatures, establishes a steady temperature gradient at both ends of a reaction tube. Based on the principle of thermohydrodynamics, a periodical movement flow field is generated in the reaction tube, so that an amplification sample performs a thermal convection between both ends of the tube at different temperatures, thereby obtaining the temperature conditions required for PCR amplification.

However, at present, there are still several deficiencies in the existing convection PCR reaction device. For example, it is not possible to effectuate real-time multi-wavelength detection of fluorescent signals in a sample amplification process, and it is not impossible to support a detection-on-arrival operation mode, which seriously affects the control of the detection time, so that the total time consumption of the PCR amplification technology cannot be reduced to an ideal range as always. Second, with a single temperature control mode, the amplification reaction is susceptible to external environmental temperature, and the detection process is less flexible. In addition, there are a great variety of devices of detection equipment, so that the structure is complex and the detection cost is high.

CONTENT OF THE INVENTION

The object of the present invention is to propose a detection mechanism for polymerase chain reaction and a polymerase chain reaction device, to realize polymerase chain reaction and perform real-time detection of a fluorescent signal in an amplification reaction.

In order to realize the aforementioned object, the present invention provides a detection mechanism for polymerase chain reaction, comprising:

at least one excitation module group, each of the excitation module groups comprising two excitation modules for providing excitation light with two wavelengths;

an excitation optical fiber, connected to the excitation modules, the excitation optical fiber being capable of transmitting the excitation light to at least one reaction tube, each of the reaction tubes receiving excitation light with two wavelengths;

a receiving optical fiber, for collecting and transmitting a fluorescent signal from the reaction tube;

at least one receiving module group, connected to the receiving optical fiber, each of the receiving module groups comprising two receiving modules, to respectively receive the fluorescent signal with two wavelengths from the same said reaction tube, and convert the fluorescent signal into an electrical signal for output;

the detection mechanism is configured to detect the reaction tube in a time division manner, and multiplex the receiving module group to obtain an output result.

Further, each of the excitation modules comprises an excitation light source and a forward optical unit, and the excitation light source for transmitting the excitation light to the excitation optical fiber via the forward optical unit, each of the excitation light sources for providing excitation light having one wavelength and respectively transmitted to the reaction tube through the excitation optical fiber.

Further, the forward optical unit comprises a lens and an excitation optical filter, the lens being located at one side proximate to the excitation light source.

Further, each of the receiving modules comprises a backward optical unit and a photoelectric sensor, the backward optical unit being used for transmitting the fluorescent signal to the photoelectric sensor, the photoelectric sensor being used for converting the fluorescent signal into an electrical signal for output.

Further, the backward optical unit comprises a focusing lens and a receiving optical filter, the focusing lens being located at one side proximate to the receiving optical fiber.

Further, an optical angle of 90 degrees is formed between the excitation optical fiber and the receiving optical fiber corresponding thereto.

In order to realize the aforementioned object, the present invention further provides a polymerase chain reaction device, comprising the aforementioned detection mechanism for polymerase chain reaction.

Further, there further comprising a human-computer interaction system, a control system, a heating module and a light shielding module, wherein:

the human-computer interaction system is in data connection with the control system, and the human-computer interaction system is configured to provide a human-machine interaction interface and receive an input instruction from an operator;

the control system is configured to control a temperature of the heating module according to an input instruction received by the human-computer interaction system;

the heating module is configured to provide a corresponding heating temperature for realizing a convection-type polymerase chain reaction;

the light shielding module is used for shielding light entering the reaction tube.

Further, the light shielding module comprises an upper light shielding cover for shielding external visible light, and a lower light shielding door comprising an elastic part, the elastic part is capable of biasing the lower light shielding door in a closed state under a normal circumstance; the lower light shielding door shields visible light from entering the reaction tube in the process that the reaction tube is inserted into a reaction hole position.

Further, the heating module comprises a high-temperature heating sub-unit, a low-temperature heating sub-unit and a thermal insulation sub-unit, wherein central portions of the high-temperature heating sub-unit, the low-temperature heating sub-unit and the thermal insulation sub-unit form a reaction hole position for inserting the reaction tube, the high-temperature heating sub-unit is arranged under the low-temperature heating sub-unit, and the thermal insulation sub-unit is arranged between the high-temperature heating sub-unit and the low-temperature heating sub-unit, for preventing the low-temperature heating sub-unit from absorbing radiation heat from the high-temperature heating sub-unit.

Further, the high-temperature heating sub-unit comprises a lower-layer heating rubber and a lower-layer thermal conduction module, wherein the lower-layer heating rubber is located on a side of the lower-layer thermal conduction module and the lower-layer thermal conduction module is configured to transfer heat generated by the lower-layer heating rubber to a lower portion of the reaction tube;

the low-temperature heating sub-unit comprises an upper-layer of heating rubber and an upper-layer thermal conduction module, wherein the upper-layer heating rubber is located on a side of the upper-layer thermal conduction module, and the upper-layer thermal conduction module is configured to transfer heat generated by the upper-layer heating rubber to an upper portion of the reaction tube;

Further, the high-temperature heating sub-unit further comprises a lower-layer temperature measuring sensor connected to the control system, for converting a measured heating temperature of the high-temperature heating sub-unit into an electrical signal and feedback the signal to the control system in real time;

the low-temperature heating sub-unit further comprises an upper-layer temperature measuring sensor connected to the control system, for converting a measured heating temperature of the low-temperature heating sub-unit into an electrical signal and feedback the signal to the control system in real time;

the control system is configured to receive temperature signals from both the lower-layer temperature measuring sensor and the upper-layer temperature measuring sensor, and regulate a heating temperature of the heating module according to a difference between the temperature signals and a temperature set by an input instruction received by the human-computer interaction system.

Based on the aforementioned technical solution, the detection mechanism of the present invention is provided with at least one excitation module group, and each of the excitation module groups comprises two excitation modules. Such at least two excitation modules are configured to provide excitation light with two wavelengths, and the excitation optical fiber transmits the excitation light with two wavelengths to the corresponding reaction tube. Each reaction tube receives excitation light with two wavelengths at different time. After the fluorescent dye in the reaction tube being irradiated by the excitation light, the fluorescent dye sends a fluorescent signal. Then the fluorescent signal is transmitted via the receiving optical fiber to at least one receiving module group. Each receiving module group receives fluorescent signals with two wavelengths from the same reaction tube and converts them into electrical signals for output.

The detection mechanism may use dual-wavelength detection, and no matter how many excitation modules and reaction tubes there are, the simultaneous detection of a plurality of reaction tubes may be accomplished by using at least one receiving module group by means of the principles of time division and multiplexing. When there are two and more reaction tubes, time division refers to the detection of two and more reaction tubes being performed at different time. Multiplexing means that multiple reaction tubes may share a receiving module group at different moments, so as to effectuate repeatedly utilizing the receiving module group, significantly reducing the amount of devices of the detection module, and lowering the complexity and cost of the module. Multiplexing the receiving module is also favorable to ensure the consistency of the detection results; In addition, the detection mechanism may allow multiple reaction tubes to perform cycled detection, to achieve real-time detection of fluorescent signals, to perform detection-on-arrival, and shorten the detection time.

1—human-computer interaction system, 2—control system, 3—detection mechanism, 31—excitation module, 311—excitation light source, 312—forward optical unit, 32—excitation optical fiber, 33—receiving optical fiber, 34—receiving module, 341—backward optical unit, 342—photoelectric sensor, 4—heating module, 41—low-temperature heating sub-unit, 42—high-temperature heating sub-unit, 43—thermal insulation sub-unit, 411—upper-layer heating rubber, 412—upper-layer temperature measuring sensor, 413—upper-layer thermal conduction module, 414—optical fiber fixing hole, 421—lower-layer heating rubber, 422—lower-layer temperature measuring sensor, 423—lower-layer thermal conduction module, 5—reaction tube, 6—light shielding module, 61—upper light shielding cover, 62—lower light shielding door.

DETAILED DESCRIPTION OF THE PREFERRED EMBODIMENTS

Next, the technical solution of the present invention is further described in detail by means of the drawings and embodiments.

In the description of the present invention, it is necessary to understand that, the azimuth or positional relations indicated by the terms "center", "transverse", "longitudinal", "front", "rear", "left", "right", "up", "down", "vertical", "horizontal", "top", "bottom", "within", "outside", which are based on the azimuth or positional relations illustrated by the drawings, are only for facilitating description of the present invention and simplifying the description, rather than indicating or implying that the device or element referred to has to present a particular azimuth, and be constructed and operated in a particular azimuth, so that it cannot be understood as limiting the protection scope of the present invention.

Figure 1:
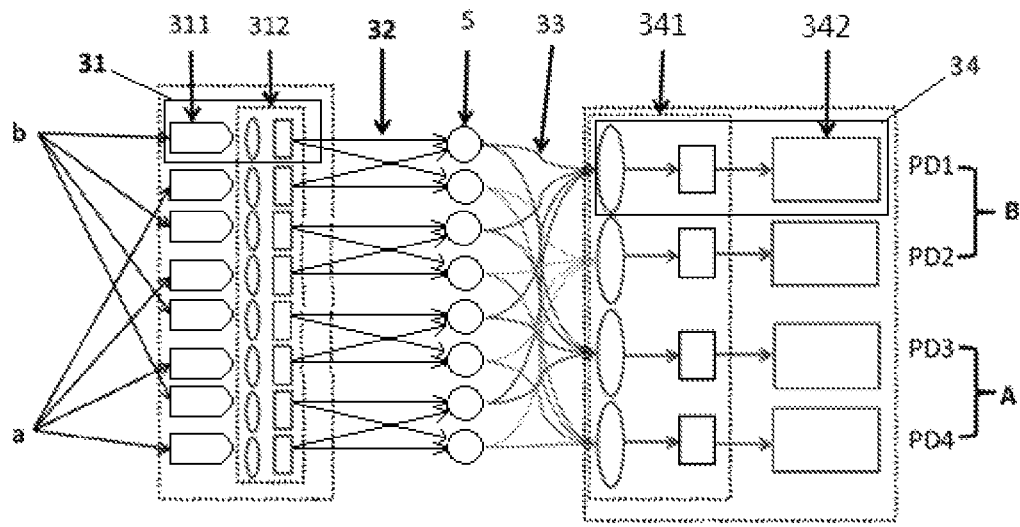
FIG. 1 is a schematic view of the structure of one embodiment of the detection mechanism for polymerase chain reaction according to the present invention.

As shown in FIG. 1, it is a schematic view of the structure of one embodiment of the detection mechanism for polymerase chain reaction according to the present invention. The detection mechanism 3 for polymerase chain reaction comprises:

at least one excitation module group, each of the excitation module groups comprising two excitation modules 31 for providing excitation light with two wavelengths;

an excitation optical fiber 32, connected to the excitation modules, the excitation optical fiber 32 being capable of transmitting the excitation light to at least one reaction tube 5, each of the reaction tubes 5 receiving excitation light with two wavelengths;

a receiving optical fiber 33, for collecting and transmitting a fluorescent signal from the reaction tube 5;

at least one receiving module group, connected to the receiving optical fiber 33, each of the receiving module groups comprising two receiving modules 34, to respectively receive the fluorescent signal with two wavelengths from the same said reaction tube 5, and convert the fluorescent signal into an electrical signal for output;

the detection mechanism 3 is configured to detect the reaction tube in a time division manner, and multiplex the receiving module group to obtain an output result.

The aforementioned detection mechanism is provided with at least one excitation module group, and each of the excitation module groups comprises two excitation modules. Such at least two excitation modules are configured to provide excitation light with two wavelengths, and the excitation optical fiber transmits the excitation light with two wavelengths to the corresponding reaction tube. Each reaction tube receives excitation light with two wavelengths. After the fluorescent dye in the reaction tube being irradiated by the excitation light, the fluorescent dye sends a fluorescent signal. Then the fluorescent signal is transmitted via the receiving optical fiber to at least one receiving module group. Each receiving module group receives fluorescent signals with two wavelengths from the same reaction tube and converts them into electrical signals for output.

The detection mechanism may use dual-wavelength detection, and no matter how many excitation modules and reaction tubes there are, the simultaneous detection of a plurality of reaction tubes may be accomplished by using at least one receiving module group by means of the principles of time division and multiplexing. When there are two and more reaction tubes, time division refers to time-division detection of two and more reaction tubes. Multiplexing means that multiple reaction tubes may share a receiving module group at different moments, so as to effectuate repeatedly utilizing the receiving module group, significantly reducing the amount of devices of the detection module, and lowering the complexity and cost of the module. Multiplexing the receiving module is also favorable to ensure the consistency of the detection results; In addition, the detection mechanism may allow multiple reaction tubes to perform cycled detection, to achieve real-time detection of fluorescent signals, to perform detection-on-arrival, and shorten the detection time.

In addition, when the excitation module group includes two and more, the wavelengths of two excitation light provided by each excitation module group may be different, that is, there may be two or more than two wavelengths, such that multi-wavelength detection may be implemented at the same reaction hole position of a reaction tube.

There are multiple options for specific implementation forms of the excitation module 31. In one preferred embodiment, each of the excitation modules 31 comprises an excitation light source 311 and a forward optical unit 312. The excitation light source 311 is configured to transmit the excitation light to the excitation optical fiber 32 via the forward optical unit 312. Each of the excitation light sources 311 is configured to provide excitation light having one wavelength and respectively transmitted to the reaction tube 5 through the excitation optical fiber 32.

Wherein, the excitation light source 311 may be selected as a light-emitting diode (LED light source), which has the advantages of small volume, low voltage, long service life and low cost. The entire row of excitation light is constituted by a plurality of LED light sources, and the LED light sources in the entire row allow for having a plurality of different wavelengths, which are respectively transferred to the reaction hole positions of a plurality of reaction tubes 5 by a plurality of excitation optical fibers 32 distributed in parallel.

In addition, the forward optical unit 312 may comprise a lens and an excitation optical filter, and the lens is located at one side proximate to the excitation light source 311, i.e., the lens is closer to the excitation light source 311, as compared with the excitation optical filter. Wherein, the lens has a converging function, and the excitation optical filter can select excitation light of a specific wavelength.

There may also be quite flexible options for the specific implementation forms of the receiving module. In one preferred embodiment, each of the receiving modules comprises a backward optical unit 341 and a photoelectric sensor 342, the backward optical unit 341 is used for transmitting the fluorescent signal to the photoelectric sensor 342, and the photoelectric sensor 342 is used for converting the fluorescent signal into an electrical signal for output.

Wherein, the photoelectric sensor 342 may be a photodiode, which has the advantages of favorable linearity, high sensitivity, low noise, low cost, small volume, and long service life. A plurality of photodiodes may constitute an entire row of photoelectric sensors, fluorescent signals from a plurality of reaction hole positions are received by a plurality of receiving optical fibers 33 distributed in parallel, and then the acquired fluorescent signals are converted into electrical signals and transmitted to the control system 2 which performs the next step of signal and data treatment.

In addition, the backward optical unit 341 comprises a focusing lens and a receiving optical filter, the focusing lens being located at one side proximate to the receiving optical fiber 33, that is, the focusing lens is closer to the receiving optical fiber 33, as compared with the receiving optical filter, so as to achieve a better receiving effect by means of the focusing lens.

In order to obtain an optimum sensitivity and signal-to-noise ratio, an optical angle of 90 degrees is formed between the excitation optical fiber 32 and the receiving optical fiber 33 corresponding thereto. Certainly, in other embodiments, other angles may also be formed between the excitation optical fiber 32 and the receiving optical fiber 33 corresponding thereto.

Figure 2:
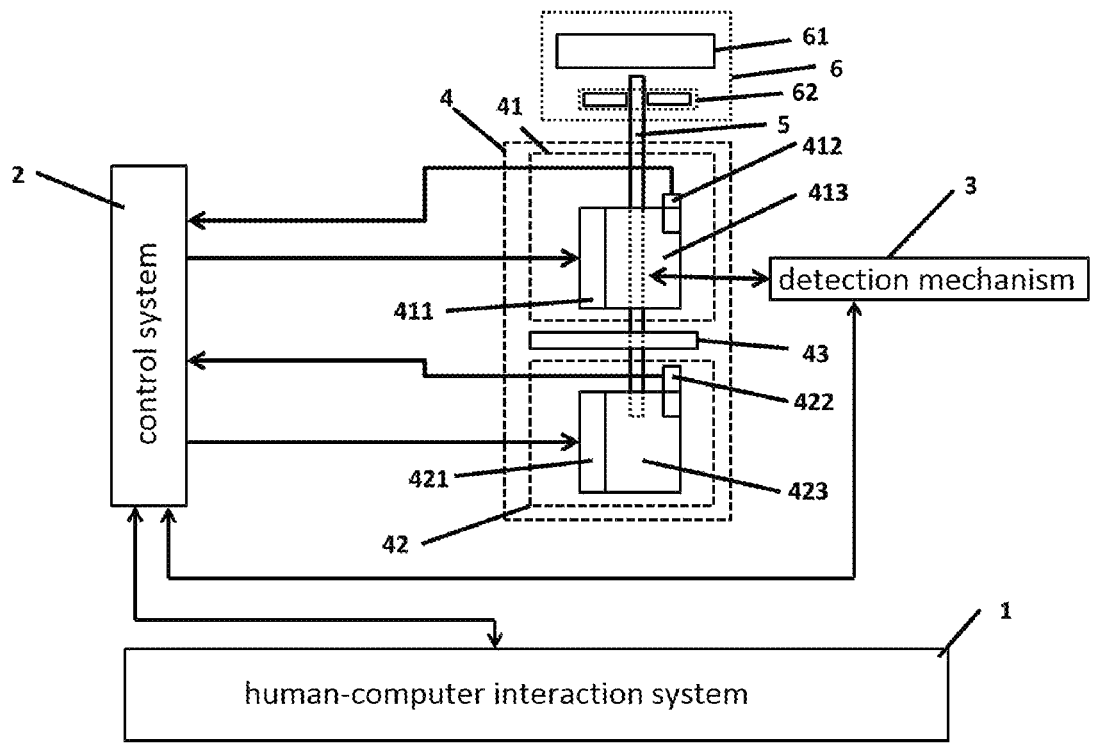
FIG. 2 is a schematic view of the structure of one embodiment of the polymerase chain reaction device according to the present invention.

As shown in FIG. 2, the present invention further sets forth a polymerase chain reaction device, comprising the detection mechanism 3 for polymerase chain reaction recited in the aforementioned various embodiments.

In one embodiment, the polymerase chain reaction device may further comprise a human-computer interaction system 1, a control system 2, a heating module 4 and a light shielding module 6, wherein:

the human-computer interaction system 1 is in data connection with the control system 2, i.e. the human-computer interaction system 1 and the control system 2 are mutually connected and realize data exchange. The human-computer interaction system 1 which is configured to provide a human-machine interaction interface and receive an input instruction from an operator, may also perform analysis and processing of data;

the control system 2 is configured to control a temperature of the heating module 4 according to an input instruction received by the human-computer interaction system 1.

the heating module 4 is configured to provide a corresponding heating temperature for realizing a convection-type polymerase chain reaction;

the light shielding module 6 is used for shielding light entering the reaction tube 5, where the light mainly refers to the light in the external environment.

Wherein, the human-computer interaction system 1 may be provided with an independent processor and a touch screen. On the one hand, it provides a friendly operation interface of human-computer interaction and controls the operation of the control system 2 according to a user input instruction. On the other hand, the test results and data files may also be analyzed and managed. The control system 2 which is used for controlling a temperature of the heating module 4 provides a stable reaction temperature for the isothermal amplification of CPCR (convective polymerase chain reaction). Data communication may be performed between the human-computer interaction system 1 and the control system 2 through the serial interface or USB interface. The detection mechanism 3 cooperates with the control system 2 to realize the real-time acquisition of the fluorescent detection signal in the isothermal amplification process of CPCR.

In addition to being capable of outputting a control signal to the heating module 4 to ensure a desired reaction temperature, the control system 2 may also cooperate with the detection mechanism to achieve multi-wavelength fluorescent detection.

Figure 3:
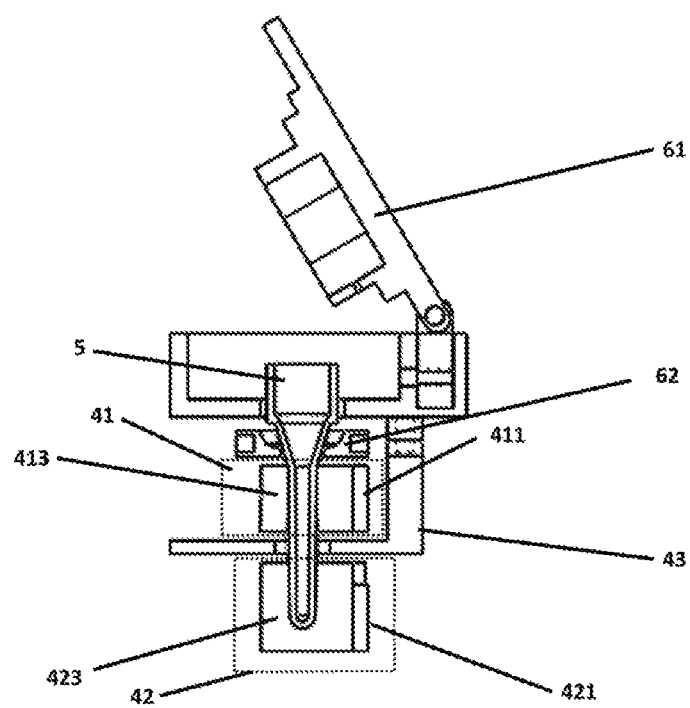
FIG. 3 is a schematic view of the structure of one independent reaction hole position in one embodiment of the polymerase chain reaction device according to the present invention.

In addition, the light shielding module 6 may be configured with an independent light shielding sub-unit directed to each detection hole position to overcome the mutual influence between the detection hole positions, so that it not only supports batch detection but also supports detection-on-arrival. As shown in FIG. 3, the light shielding module 6 comprises an upper light shielding cover 61 for shielding visible light in external environment, and a lower light shielding door 62 comprising an elastic part. The elastic part is capable of biasing the lower light shielding door 62 in a closed state under a normal circumstance; the lower light shielding door 62 is capable of shielding visible light from entering the reaction tube 5 in the process that the reaction tube 5 is inserted into a reaction hole position.

The upper light shielding cover 61 may shield visible light from the external environment of the device. The lower light shielding door 62 comprises an elastic part, i.e., the lower light shielding door 62 is a spring door. Due to the pulling effect of the spring force, the lower light shielding door 62 is always in a closed state unless the reaction tube 5 is inserted. Thus, it can prevent visible light inside the instrument from entering a detection hole position. More importantly, after the upper light shielding cover 61 is opened, the lower light shielding door 62 can block the visible light that may enter the detection hole before inserting the reaction tube 5 or in the insertion process, which effectively overcomes the mutual interference and influence between the detection hole positions under the operation mode of detection-on-arrival.

Figure 4:
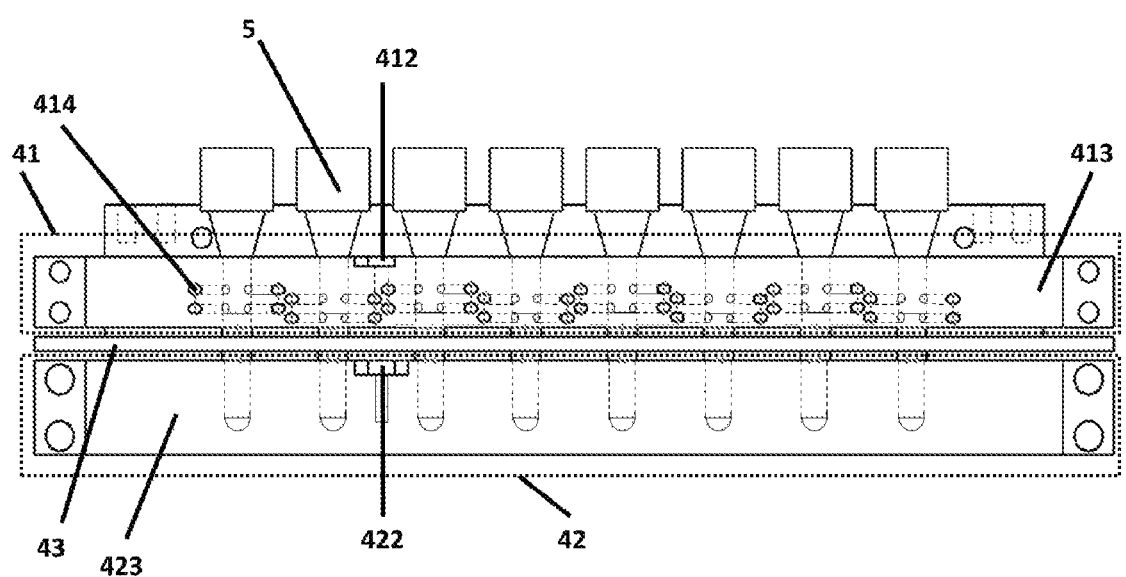
FIG. 4 is a schematic view of the structure of a heating module in one embodiment of the polymerase chain reaction device according to the present invention.

To achieve a convective polymerase chain reaction, the heating module 4 needs to provide the reaction temperature conditions required for convectional amplification. In one embodiment, as shown in FIG. 4, the heating module 4 comprises a high-temperature heating sub-unit 42, a low-temperature heating sub-unit 41 and a thermal insulation sub-unit 43, wherein central portions of the high-temperature heating sub-unit 42, the low-temperature heating sub-unit 41 and the thermal insulation sub-unit 43 form a reaction hole position for inserting a reaction tube 5. The high-temperature heating sub-unit 42 is arranged under the low-temperature heating sub-unit 41, and the thermal insulation sub-unit 43 is arranged between the high-temperature heating sub-unit and the low-temperature heating sub-unit 41. The thermal insulation sub-unit 43 is used for preventing the low-temperature heating sub-unit 41 from absorbing radiation heat from the high-temperature heating sub-unit 42.

In the heating module 4, the lower portion and the upper portion of the reaction tube 5 are respectively heated by the high-temperature heating sub-unit 42 and the low-temperature heating sub-unit 41, so as to ensure a temperature environment required for the amplification reaction on one hand, and to effectively overcome the possible influence brought to the amplification reaction by fluctuation of an environment temperature, so as to ensure the amplification reaction efficiency on the other hand.

Wherein, the control system 2 includes two temperature control circuits which respectively control the reaction temperatures of the high-temperature heating sub-unit 42 and the low-temperature heating sub-unit 41 of the heating module 4.

The reaction hole position is formed at central portions of the high-temperature heating sub-unit 42, the low-temperature heating sub-unit 41 and the thermal insulation sub-unit 43, so that there is a very uniform heating of the lower portion and the upper portion of the reaction tube 5 respectively by the high-temperature heating sub-unit 42 and the low-temperature heating sub-unit 41. Certainly, in other embodiments, the reaction hole position may also be formed at a position offset from the center of the high-temperature heating sub-unit 42 and the low-temperature heating sub-unit 41.

The middle of the thermal insulation sub-unit 43 includes a through hole forming a reaction hole position so that the reaction tube 5 can smoothly enter the high-temperature heating sub-unit 42 and the low-temperature heating sub-unit 41. The thermal insulation sub-unit 43 conducts the radiation heat of the high-temperature heating sub-unit 42 to a side, and then radiate the heat to the environment via an external radiation fin.

The specific structures of the high-temperature heating sub-unit 42 and the low-temperature heating sub-unit 41 may be in a way such that: the high-temperature heating sub-unit 42 comprises a lower-layer heating rubber 421 and a lower-layer thermal conduction module 423, wherein the lower-layer heating rubber 421 is located on a side of the lower-layer thermal conduction module 423, and the lower-layer thermal conduction module 423 is configured to transfer heat generated by the lower-layer heating rubber 421 to a lower portion of the reaction tube 5;

the low-temperature heating sub-unit 41 comprises an upper-layer heating rubber 411 and an upper-layer thermal conduction module 413, wherein the upper-layer heating rubber 411 is located on a side of the upper-layer thermal conduction module 413, and the upper-layer thermal conduction module 413 is configured to transfer heat generated by the upper-layer heating rubber 411 to an upper portion of the reaction tube 5.

In the heating module 4, the upper-layer heating rubber 411 is located lateral to the upper-layer thermal conduction module 413, and the lower-layer heating rubber 421 is located lateral to the lower-layer thermal conduction module 423. By using the lateral heating manner, the temperature uniformity of the high-temperature heating sub-unit 42 and the low-temperature heating sub-unit 41 may be improved on one hand, and the thermal load of the high-temperature heating sub-unit 42 and the low-temperature heating sub-unit 41 themselves may be reduced on the other hand. The thermal insulation sub-unit 43 may effectively overcome the influence of the high-temperature heating sub-unit 42 over the low-temperature heating sub-unit 41, and ensure the isothermal amplification efficiency.

In addition, an optical fiber fixing hole 414 may be provided on the upper-layer thermal conduction module, for fixing the excitation optical fiber 32 and the receiving optical fiber 33.

In order to realize effective temperature control, the high-temperature heating sub-unit 42 further comprises a lower-layer temperature measuring sensor 422 connected to the control system 2, for converting a measured heating temperature of the high-temperature heating sub-unit 42 into an electrical signal and feedback the signal to the control system 2 in real time;

the low-temperature heating sub-unit 41 further comprises an upper-layer temperature measuring sensor 412 connected to the control system 2, for converting a measured heating temperature of the low-temperature heating sub-unit 41 into an electrical signal and feedback the signal to the control system 2 in real time;

the control system 2 is configured to receive temperature signals from both the lower-layer temperature measuring sensor 422 and the upper-layer temperature measuring sensor 412, and regulate a heating temperature of the heating module 4 according to a difference between the temperature signals and a temperature set by an input instruction received by the human-computer interaction system 1. Specifically, the control system 2 may adjust a temperature control signal of the heating module 4 according to the difference so as to reach a proper heating temperature, so that the temperature of the reaction tube 5 is maintained in an appropriate range.

The control system 2 respectively adjusts an amplitude of a drive signal output to the high-temperature heating sub-unit 42 and the low-temperature heating sub-unit 41 to effectuate dual-circuit closed-loop temperature control according to a built-in control algorithm, based on a difference between an actual temperature detected by the lower-layer temperature measuring sensor 422 and the upper-layer temperature measuring sensor 412 and an initial set temperature.

The following describes the structural principles of one embodiment of the detection mechanism for polymerase chain reaction and the polymerase chain reaction device of the present invention.

Taking the number of eight reaction hole positions as an example, the high-temperature heating sub-unit 42 and the low-temperature heating sub-unit 41 respectively comprises eight upper and lower layer reaction hole positions corresponding to each other, and both of them cooperate with each other to allow the eight reaction tubes 5 to perform the isothermal amplification of convective PCR simultaneously.

The fluorescent dye within the reaction tube 5 includes two categories, respectively corresponding to two wavelengths. One excitation light source 311 is transmitted to two reaction tubes 5 via the forward optical unit 312 constituted by the excitation optical filter and the lens, and then via the excitation optical fiber 32. In order to achieve dual-wavelength detection of eight hole positions, a group is constituted by four light-emitting diodes of one wavelength (group a), and another group is constituted by four light-emitting diodes of another wavelength (group b). The excitation module group is constituted by eight light-emitting diodes in total as well as their corresponding forward optical units 312.

In order to reduce the amount of the photoelectric sensor, the fluorescent signals of the same wavelength from four reaction tubes 5 are respectively collected by four independent receiving optical fibers 33, and then enter the same light-emitting diode via the backward optical unit 341 constituted by a converging lens and a receiving optical filter. The four photodiodes (PD1, PD2, PD3, PD4) are all divided into two groups (group A and group B), either of which corresponds to a fluorescent wavelength.

In the fluorescent detection process, the excitation sub-unit 31 and the receiving sub-unit 32 are subject to logical control by the control system 2. According to certain principles of time division and multiplexing, at certain moment, dual-wavelength detection is performed only for a single reaction tube 5, or a plurality of reaction tubes 5 not interfering with each other. By sharing the excitation light source and the light-emitting diode sensor among the plurality of reaction tubes 5, the amount of devices of the fluorescent detection mechanism is significantly reduced, and the complexity and cost of the module are reduced. At the same time, the detection sensor in common is favorable to ensure the consistency of the detection results.

Through the description of a plurality of embodiments of the detection mechanism for polymerase chain reaction and the polymerase chain reaction device of the present invention, it can be seen that the embodiments of the detection mechanism for polymerase chain reaction and the polymerase chain reaction device of the present invention, which support fluorescent dyes of a plurality of wavelengths, with the characteristics of simple structure, short detection time, low cost and small volume, and support the operation mode of detection-on-arrival, pertain to a nucleic acid diagnosis and analysis device with high flexibility, wide applicability and high efficiency.

The embodiments of the detection mechanism for polymerase chain reaction and the polymerase chain reaction device of the present invention can realize a convective polymerase chain reaction. Compared with the ordinary PCR technology, the convective PCR which relies on a single or two constant temperatures as a reaction heat source, significantly reduces the complexity of the gene amplification device. At the same time, the periodical heat cycle required for PCR amplification is realized by thermal convection of a reaction sample within a reaction tube, and the periodical time of its heat cycle is significantly less than the periodical time of a heat cycle of an ordinary PCR. Thus, the convective PCR can often be completed in 20-30 minutes.

Compared with the ordinary PCR, the convective PCR based on isothermal reaction conditions can significantly reduce the complexity and detection cost of the device, and shorten the detection time. The real-time convective PCR amplification enables real-time detection of fluorescent signals in the sample amplification process, to judge the positivity/negativity of the detection sample, and even semi-quantitative/quantitative detection may be performed. The real-time convective PCR amplification omits various subsequent detection steps of nucleic acid amplification products such as electrophoresis detection. On one hand, it is favorable to overcome a fake positivity resulting from pollution of an aerosol, and on the other hand, the detection time is also further shortened, so that there is a favorable development and application prospect in the field of rapid detection of diseases based on nucleic acid diagnosis.

The aforementioned only pertains to preferred embodiments of the present invention. It should be set forth that, for a common technical person in the art, on the premise of not departing away from the principles of the present invention, several improvements and decorations may also be made to the present utility model, and such modifications and decorations should also be deemed as the protection scope of the present invention.

The invention claimed is:

1. A polymerase chain reaction device, comprising:
   a heating module for providing heat to a convection-type polymerase chain reaction in the device;
   the heating module including:
     a low-temperature heating sub-unit;
     a high-temperature heating sub-unit arranged under the low-temperature heating sub-unit; and
     a thermal insulation sub-unit arranged between the low-temperature heating sub-unit and the high-temperature heating sub-unit, for preventing the low-temperature heating sub-unit from absorbing radiation heat from the high-temperature heating sub-unit; and
   wherein central portions of the high-temperature heating sub-unit, the low-temperature heating sub-unit and the thermal insulation sub-unit form a reaction hole position for inserting a reaction tube;
   the polymerase chain reaction device further comprising a light shielding module for shielding light entering the reaction tube;
   the light shielding module including:
     an upper light shielding cover for shielding external visible light, and
     a lower light shielding door including an elastic part for biasing the lower light shielding door in a closed state, such that the lower light shielding door shields visible light from entering the reaction tube in the process that the reaction tube is inserted into a reaction hole position.

2. The polymerase chain reaction device according to claim 1, wherein,
   the high-temperature heating sub-unit includes a lower-layer heating rubber and a lower-layer thermal conduction module, wherein the lower-layer heating rubber is located on a side of the lower-layer thermal conduction module, and the lower-layer thermal conduction module is configured to transfer heat generated by the lower-layer heating rubber to a lower portion of the reaction tube; and
   the low-temperature heating sub-unit comprises an upper-layer heating rubber and an upper-layer thermal conduction module, wherein the upper-layer heating rubber is located on a side of the upper-layer thermal conduction module, and the upper-layer thermal conduction module is configured to transfer heat generated by the upper-layer heating rubber to an upper portion of the reaction tube.

3. The polymerase chain reaction device according to claim 1, further including a human-computer interaction system and a control system;
   wherein the human-computer interaction system is in data connection with the control system;
   wherein the human-computer interaction system is configured to provide a human-machine interaction interface and receive an input instruction from an operator; and
   wherein the control system is configured to control a temperature of the heating module according to an input instruction from the human-computer interaction system.

4. The polymerase chain reaction device according to claim 3, wherein the high-temperature heating sub-unit comprises a lower-layer temperature measuring sensor for converting a measured heating temperature of the high-temperature heating sub-unit into an electrical signal and feedback the signal to the control system in real time;
   wherein the low-temperature heating sub-unit comprises an upper-layer temperature measuring sensor for converting a measured heating temperature of the low-temperature heating sub-unit into an electrical signal and feedback the signal to the control system in real time;
   wherein the control system is configured to receive the signals from both the lower-layer temperature measuring sensor and the upper-layer temperature measuring sensor, and regulate a heating temperature of the heating module according to a difference between the signals and a temperature set by an input instruction received by the human-computer interaction system.

5. The polymerase chain reaction device according to claim 1, further including a detection mechanism, the detection mechanism including:
   at least one excitation module group, each excitation module group of the at least one excitation module group comprising two excitation modules for providing two beams of excitation light with different wavelengths;
   an excitation optical fiber, for transmitting all the two beams of excitation light with different wavelengths from the at least one excitation module group to at least one reaction tube, each reaction tube of the at least one reaction tube receiving two beams of excitation light with different wavelengths;

a receiving optical fiber, for collecting and transmitting a fluorescent signal from the at least one reaction tube;

at least one receiving module group, each receiving module group of the at least one receiving module group including two receiving modules, for respectively receiving the fluorescent signal from a same reaction tube, and converting the fluorescent signal into an electrical output signal; and wherein the detection mechanism is configured to detect the at least one reaction tube in a time division manner, and multiplex the at least one receiving module group to obtain an output result.

6. The polymerase chain reaction device according to claim 5, wherein each of the excitation modules includes an excitation light source and a forward optical unit, wherein the excitation light source transmits the excitation light to the excitation optical fiber by way of the forward optical unit, wherein each of the excitation light sources provides excitation light having a wavelength different from that of other excitation light sources and transmitting the light to the reaction tube through the excitation optical fiber.

7. The polymerase chain reaction device according to claim 6, wherein the forward optical unit includes a lens and an excitation optical filter, wherein the lens is located between the excitation light source and the excitation optical filter.

8. The polymerase chain reaction device according to claim 5, wherein each of the receiving modules includes:

a photoelectric sensor, for converting the fluorescent signal into an electrical output signal; and a backward optical unit, for transmitting the fluorescent signal to the photoelectric sensor.

9. The polymerase chain reaction device according to claim 8, wherein the backward optical unit includes a focusing lens and a receiving optical filter, the focusing lens being located between the receiving optical fiber and the receiving optical filter.

10. The polymerase chain reaction device according to claim 5, wherein the excitation optical fiber and the receiving optical fiber corresponding thereto are arranged with an optical angle of 90 degrees.

* * * * *